(12) United States Patent
Niwa

(10) Patent No.: US 11,835,035 B2
(45) Date of Patent: Dec. 5, 2023

(54) RECTIFYING DEVICE

(71) Applicant: SUBARU CORPORATION, Tokyo (JP)

(72) Inventor: Hitoshi Niwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 20 days.

(21) Appl. No.: 17/236,831

(22) Filed: Apr. 21, 2021

(65) Prior Publication Data

US 2021/0355923 A1 Nov. 18, 2021

(30) Foreign Application Priority Data

May 12, 2020 (JP) .................. 2020-083641

(51) Int. Cl.
*F03H 1/00* (2006.01)
*B62D 35/00* (2006.01)

(52) U.S. Cl.
CPC ........... *F03H 1/0087* (2013.01); *B62D 35/00* (2013.01)

(58) Field of Classification Search
CPC .................................................. F03H 1/0087
See application file for complete search history.

(56) References Cited

U.S. PATENT DOCUMENTS

| | | | |
|---|---|---|---|
| 5,899,416 A * | 5/1999 | Meister | B64C 21/06 244/87 |
| 7,624,941 B1 * | 12/2009 | Patel | B62D 35/007 244/3.22 |
| 2010/0133386 A1 * | 6/2010 | Schwimley | H05H 1/54 315/111.21 |
| 2015/0267727 A1 | 9/2015 | Segawa et al. | |
| 2017/0282982 A1 | 10/2017 | Nagasawa et al. | |
| 2017/0326989 A1 | 11/2017 | Segawa et al. | |
| 2018/0009394 A1 | 1/2018 | Okabe et al. | |

(Continued)

FOREIGN PATENT DOCUMENTS

| JP | WO 2016-125405 A1 | 8/2016 |
|---|---|---|
| JP | 2017157562 A | 9/2017 |
| JP | 2017-178184 A | 10/2017 |

(Continued)

OTHER PUBLICATIONS

Japanese Office Action, dated Sep. 19, 2023, in Japanese Application No. 2020-083641 and English Translation thereof.

*Primary Examiner* — Arun Goyal
*Assistant Examiner* — William L Breazeal
(74) *Attorney, Agent, or Firm* — McGinn I.P. Law Group, PLLC

(57) ABSTRACT

A rectifying device includes an air flow generator. The air flow generator is disposed at an exterior member of a vehicle. The exterior member is adjacent to a detector of a sensor that is disposed such that at least a portion of a detection range of the detector includes a rear region behind a plane in a traveling direction of the vehicle. The plane is parallel to a width direction and a vertical direction of the vehicle. The air flow generator is configured to generate an air flow that separates, from the detector of the sensor, travelling wind that accompanies travel of the vehicle. The air flow generator includes a plasma actuator that includes at least a pair of electrodes and a power source that is configured to apply an alternating current voltage to the electrodes.

11 Claims, 7 Drawing Sheets

(56) References Cited

U.S. PATENT DOCUMENTS

2020/0056585 A1\* 2/2020 Messing .............. F03D 7/0224
2020/0076996 A1 3/2020 Yoshii

FOREIGN PATENT DOCUMENTS

| JP | 2017222307 A | 12/2017 |
|----|--------------|---------|
| JP | 2019111965 A | 7/2019 |
| JP | 2020032823 A | 3/2020 |

\* cited by examiner

RECTIFYING DEVICE

CROSS-REFERENCE TO RELATED APPLICATIONS

The present application claims priority from Japanese Patent Application No. 2020-083641 filed on May 12, 2020, the entire contents of which are hereby incorporated by reference.

BACKGROUND

The disclosure relates to a rectifying device configured to aerodynamically suppress adherence of foreign matter to a detector of a sensor that acquires information around a vehicle.

A vehicle, such as an automobile, is provided with a view securing member, such as a mirror, to visually recognize locations that are not possible or not easy to be visually recognized directly by a user, such as a driver. Such locations are, for example, a location behind the vehicle, a location on the rear sides thereof, blind spots of the vehicle body, and the like.

In recent years, it has been proposed to use, as an alternative to a mirror, a so-called electronic mirror including an imaging device and an image display device to secure view.

Electronic mirrors enable a lens part of a camera to be compact with respect to a mirror surface of an existing rear view mirror and are effective for reducing air resistance, improving fuel efficiency, and reducing wind noise.

Electronic mirrors are, however, adversely affected in terms of view when foreign matter, such as raindrops, adheres to the lens surface of the camera. Thus, a technology that suppresses adherence of foreign matter to a detector of a sensor has been desired.

As an existing technology relating to such a view securing member, for example, Japanese Unexamined Patent Application Publication No. 2017-178184 describes that a structure having a wing section shape is provided to project from a vehicle body, and an imaging window for a camera configured to image the outside is provided at a surface that is disposed along an air flow so that the imaging window is suppressed by the air flow from being stained.

SUMMARY

An aspect of the disclosure is a rectifying device that includes an air flow generator. The air flow generator is disposed at an exterior member of a vehicle. The exterior member is adjacent to a detector of a sensor that is disposed such that at least a portion of a detection range of the detector includes a rear region behind a plane in a traveling direction of the vehicle. The plane is parallel to a width direction and a vertical direction of the vehicle. The air flow generator is configured to generate an air flow that separates, from the detector of the sensor, travelling wind that accompanies travel of the vehicle. The air flow generator includes a plasma actuator that includes at least a pair of electrodes and a power source that is configured to apply an alternating current (AC) voltage to the electrodes.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

The above-described existing technology intends to secure view by utilizing so-called travelling wind that accompanies travel of a vehicle and does not obtain an effect while the vehicle stops or travels at a low velocity. In a rainy weather, travelling wind that flows along the imaging wind may contain, in itself, raindrops.

It is desirable to provide a rectifying device that is configured to suppress adherence of foreign matter to a detector of a sensor effectively with a simple configuration.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Hereinafter, a first embodiment of a rectifying device to which the disclosure is applied will be described.

The rectifying device according to the first embodiment is provided, for example, at a side view camera that projects from a vehicle-body side surface of an automobile, such as a passenger car, and is configured to image the vehicle rear side.

Such a side view camera is provided, as an alternative to a known side view mirror (typically, a door mirror), as an imaging unit of a so-called electronic mirror.

Figure 1:
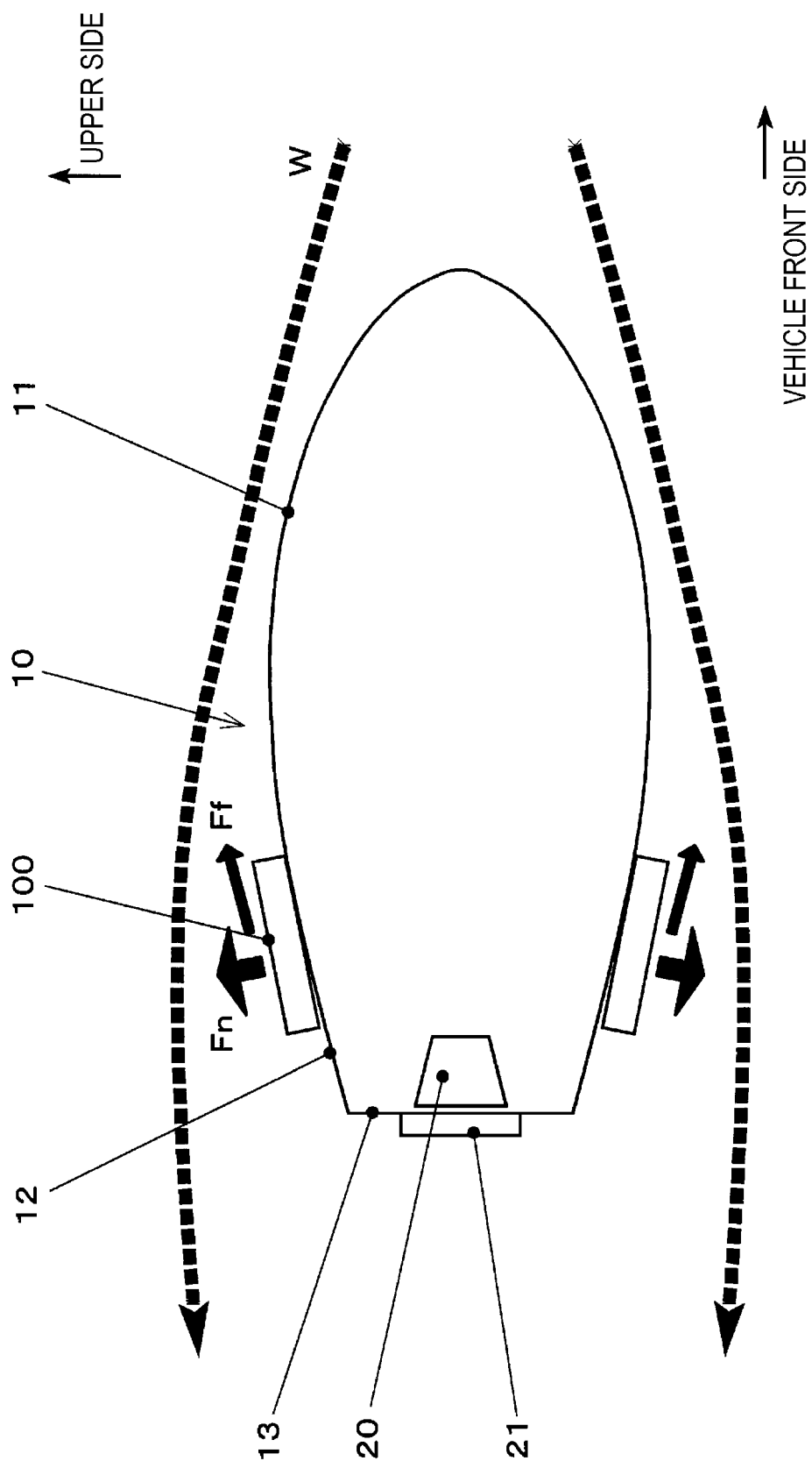
FIG. 1 is a schematic view of a configuration of a side view camera including a first embodiment of a rectifying device to which the disclosure is applied.

FIG. 1 is a schematic view of a configuration of a side view camera that includes a rectifying device according to the first embodiment.

As illustrated in FIG. 1, a side view camera 1 includes a housing 10, a camera 20, a plasma actuator 100, and the like.

The housing 10 is a housing that houses the camera 20 and the like and is formed of, for example, a resin material of a polypropylene (PP) or the like.

The housing 10 is disposed to project outward in the vehicle width direction from a vehicle side surface (typically, an upper portion of a front door panel, a front fender, or the like), which is not illustrated, of a vehicle with a stay interposed therebetween.

The housing 10 has a front half portion 11 (the right half portion in FIG. 1) whose front end is, for example, a convex surface, such as a spherical surface. On the rear side thereof, the front half portion 11 has a so-called bullet shape having a diameter gradually increasing to form a convex surface.

The housing 10 has a rear half portion 12 (the left half portion in FIG. 1) that has a tapered cylindrical shape whose diameter gradually decreases toward the rear side.

In one embodiment, a surface of the rear half portion 12 may serve as a "second face".

In the housing 10, a thickest portion in which the thickness of the housing 10 in the up-down direction is the largest is formed between the front half portion 11 and the rear half portion 12 described above.

A rear face 13 is provided at the rear end of the housing 10. In one embodiment, the rear face 13 may serve as a "first face".

The rear face 13 is along a plane substantially orthogonal the front-rear direction of a vehicle and faces the vehicle rear side.

The periphery of the rear face 13 is connected with the rear end of the rear half portion 12 with an edge-shaped joint therebetween.

The camera 20 is an imaging device that is provided in the inner portion of the housing 10 and configured to image an image of the rear side of the vehicle.

The camera 20 includes, for example, a solid state image sensor, such as a CMOS and a CCD, and an optical lens 21 that condenses light and forms an image on a sensor surface thereof.

Data relating to an image imaged by the camera 20 is subjected to publicly known image processing that controls, for example, contrast, color balance, and the like and is then displayed, for example, on a rear-side monitor (not illustrated) disposed in the vehicle interior and is used to detect an obstacle and the like by using other image processing.

The camera 20 is disposed, in the inner portion of the housing 10, in a region adjacent to the rear face 13.

The lens 21 is provided near the center portion of the rear face 13 and exposed on the outer side (the rear side of the housing 10) of the vehicle.

The plasma actuator 100 is an air flow generator that is mounted at an outer portion of the housing 10 and capable of generating an air flow.

The plasma actuator 100 is mounted at, for example, each of the upper surface and the lower surface of the housing 10 near an intermediate portion of the housing 10 between the front half portion 11 and the rear half portion 12.

The plasma actuator 100 may be provided at a side surface (not illustrated) of the housing 10.

Hereinafter, a structure and functions of the plasma actuator 100 will be described.

Figure 2:
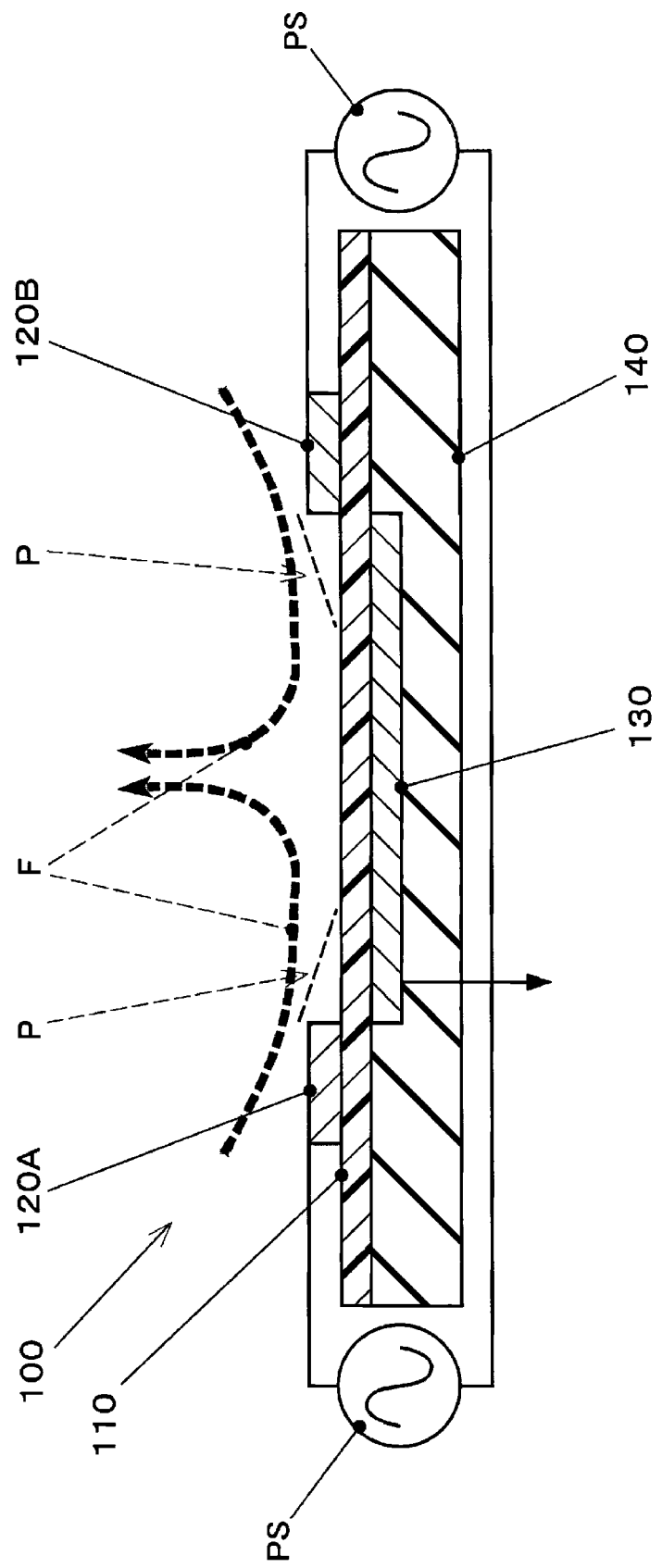
FIG. 2 is a schematic sectional view of a three-electrode plasma actuator provided at the rectifying device according to the first embodiment.

FIG. 2 is a schematic sectional view of a three-electrode plasma actuator provided at the rectifying device according to the first embodiment.

The three-electrode plasma actuator 100 includes a dielectric 110, upper electrodes 120 (120A and 120B), a lower electrode 130, an insulator 140, and the like.

The dielectric 110 is a sheet-shaped member that is formed of, for example, a fluorocarbon resin, such as polytetrafluoroethylene, and the like.

The upper electrodes 120 and the lower electrode 130 are each constituted by, for example, a conductive tape that is formed of a metal thin film of copper or the like.

The upper electrodes 120 are attached to the surface side (the side exposed to the outside when mounted on the vehicle body or the like) of the dielectric 110.

The lower electrode 130 is attached to the back surface side of the dielectric 110.

The upper electrodes 120 and the lower electrode 130 are disposed to be shifted from each other in the planar direction of the dielectric 110.

In the three-electrode plasma actuator 100 illustrated in FIG. 2, a pair of the upper electrodes 120 (120A and 120B) are symmetrically disposed on two sides with the lower electrode 130 interposed therebetween. Each of the upper electrodes 120A and 120B is provided with an independent power source PS.

The insulator 140 is a sheet-shaped member that serves as a base of the plasma actuator 100 and is disposed on the back surface side of the dielectric 110 to cover the lower electrode 130.

When an alternating current (AC) voltage having a predetermined waveform is applied to the upper electrodes 120 (120A and 120B) and the lower electrode 130 of the plasma actuator 100 by the power sources PS, a plasma discharge P is generated between the electrodes.

The application voltage is a high voltage that causes dielectric breakdown and generates the plasma discharge P. The application voltage can be, for example, about 1 to 10 kV.

The frequency of the application voltage can be, for example, about 1 to 10 kHz.

The plasma discharge P attracts air on the surface side of the plasma actuator 100 and generates an air flow F in a wall-jet form flowing along the dielectric 110.

The plasma actuator 100 is also capable of reversing the direction of the air flow F by controlling the waveform of an AC voltage to be applied.

Such a three-electrode plasma actuator 100 can generate mutually facing air flows F by using, for example, plasma P formed between the upper electrode 120A and the lower electrode 130 and plasma P formed between the upper electrode 120B and the lower electrode 130.

In this case, the mutually facing air flows F collide with each other, are deflected while merging together, and can form (combine) an air flow that flows in a direction (typically, the normal direction or the like) away from the major planar surface of the plasma actuator 100.

In addition, the three-electrode plasma actuator 100 can form an air flow that travels along the surface thereof by energizing only one of the upper electrodes 120 (120A and 120B).

It is also possible by controlling a voltage or the like to be applied to the upper electrodes 120A and 120B to control the traveling direction of the merged air flow.

The rectifying device according to the first embodiment includes a control system described below to control whether to cause the plasma actuator 100 to generate an air flow and control direction and strength when the air flow is to be generated.

Figure 3:
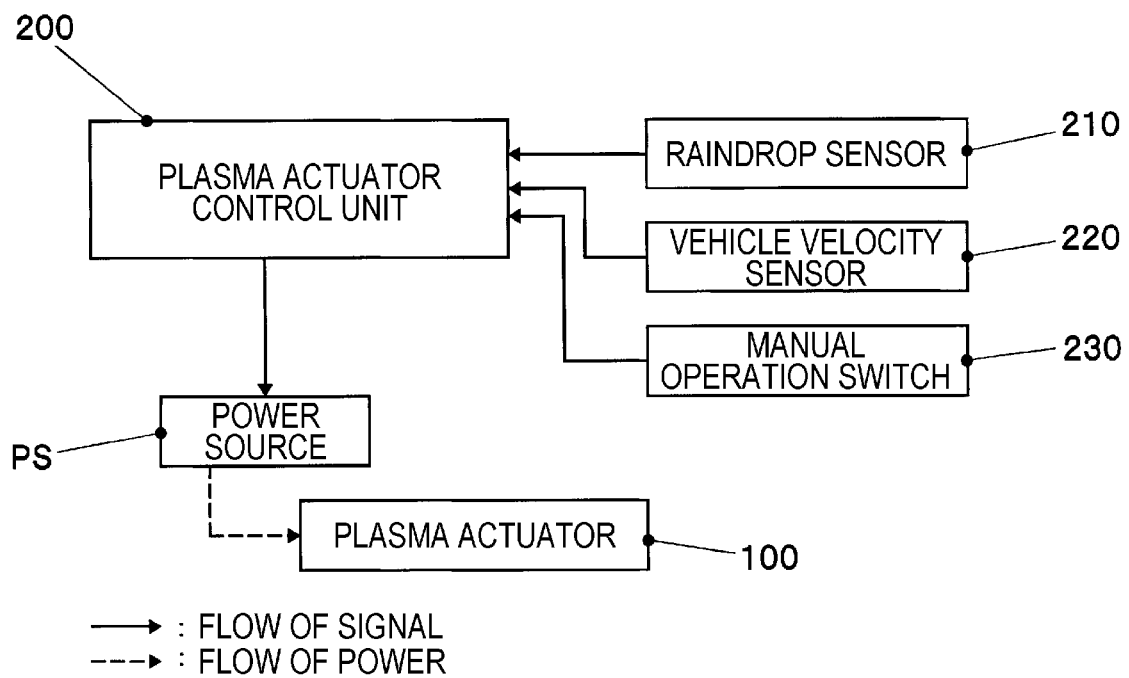
FIG. 3 is a block diagram schematically illustrating a configuration of a control system in the rectifying device according to the first embodiment.

FIG. 3 is a block diagram schematically illustrating a configuration of the control system in the rectifying device according to the first embodiment.

The control system includes a plasma actuator control unit 200, a raindrop sensor 210, a vehicle velocity sensor 220, a manual operation switch 230, and the like.

The plasma actuator control unit 200 is configured to control the power sources PS to thereby control whether to cause the plasma actuator 100 to generate an air flow and control the direction and the strength (air velocity) of an air flow.

The plasma actuator control unit 200 can be configured as a microcomputer that includes, for example, an information processor, such as a CPU, a memory, such as a RAM and a ROM, an input-output interface, a bus that couples these, and the like.

The raindrop sensor 210 includes a vibration pickup that is provided, for example, at a front window glass (front screen/window shield) of a vehicle and configured to detect vibration specific to a rainfall time (at the time of collision of raindrops).

The vehicle velocity sensor 220 is a sensor that is configured to detect the travelling velocity (vehicle velocity) of a vehicle.

The strength (flow velocity) of an air flow (travelling wind) that flows around a vehicle body relatively to the vehicle body during travel of a vehicle is considered to increase in response to an increase in vehicle velocity.

The vehicle velocity sensor 220 is provided, for example, at a hub rotatably supporting wheels and can be configured to generate a vehicle velocity signal having a frequency proportional to the rotational speed of the wheels.

With respect to the manual operation switch 230, an operation in which a user, such as a driver, manually operates the plasma actuator 100 is input.

The manual operation switch 230 may be used also as a switch of, for example, a wiper device configured to wipe a front window glass so that the plasma actuator 100 is operated in conjunction with the wiper device when the wiper device is operated.

When a rainfall state is detected by the raindrop sensor 210 or the like, or when a turn-on operation is performed on the manual operation switch 230, the plasma actuator control unit 200 supplies power from the power sources PS to the plasma actuator 100 to eject an air flow.

For example, the plasma actuator 100 may generate an air flow Ff that is ejected along the surface of the housing 10 toward the vehicle front side.

Instead of the air flow Ff, an air flow Fn (an air flow including a velocity component in a direction away from the surface of the housing 10) that travels in a direction away from the housing 10 in the normal direction of the surface of the housing 10 may be generated. Such air flows Ff and Fn each have a function of separating a travelling wind W from the surface of the housing 10.

Ejection of these air flows Ff and Fn separates, from the surface of the housing 10, the travelling wind W flowing from the vehicle front side and blows the travelling wind W in a direction away from the housing 10. Consequently, it is possible to suppress adherence of raindrops and the like to the lens 21 due to the travelling wind W that includes foreign matter, such as raindrops, flowing toward the rear face 13.

One of the air flow Ff and the air flow Fn that exerts a higher stain suppression effect for glass 21 can be selected to be generated in accordance with, for example, the vehicle velocity of the vehicle.

In some embodiments, the strength (flow velocity) of an air flow generated by the plasma actuator 100 is also increased in accordance with an increase in vehicle velocity (an increase in the flow velocity of travelling wind).

At a non-rainfall time, the effect of rectifying the travelling wind W around the housing 10 may be increased by stopping the drive of the plasma actuator 100 or by ejecting an air flow (not illustrated) from the plasma actuator 100 toward the vehicle rear side.

As described above, according to the first embodiment, it is possible, by causing the plasma actuator 100 to generate the air flow Ff or Fn that separates the travelling wind W from the side of the rear face 13 of the housing 10 at which the lens 21 is provided, to suppress foreign matter, for example, water droplets (raindrops), dust, grime, soil, and mud from being carried by the travelling wind, flowing toward the rear face 13, and adhering to the lens 21 of the camera 20.

It is also possible, by using the plasma actuator 100, to generate an air flow in a desired direction responsively with a simple structure having no movable part.

Second Embodiment

Next, a second embodiment of a rectifying device to which the disclosure is applied will be described.

In each embodiment described below, components common to the previous embodiment are given the same reference signs and will not be described, and differences will be mainly described.

Figure 4:
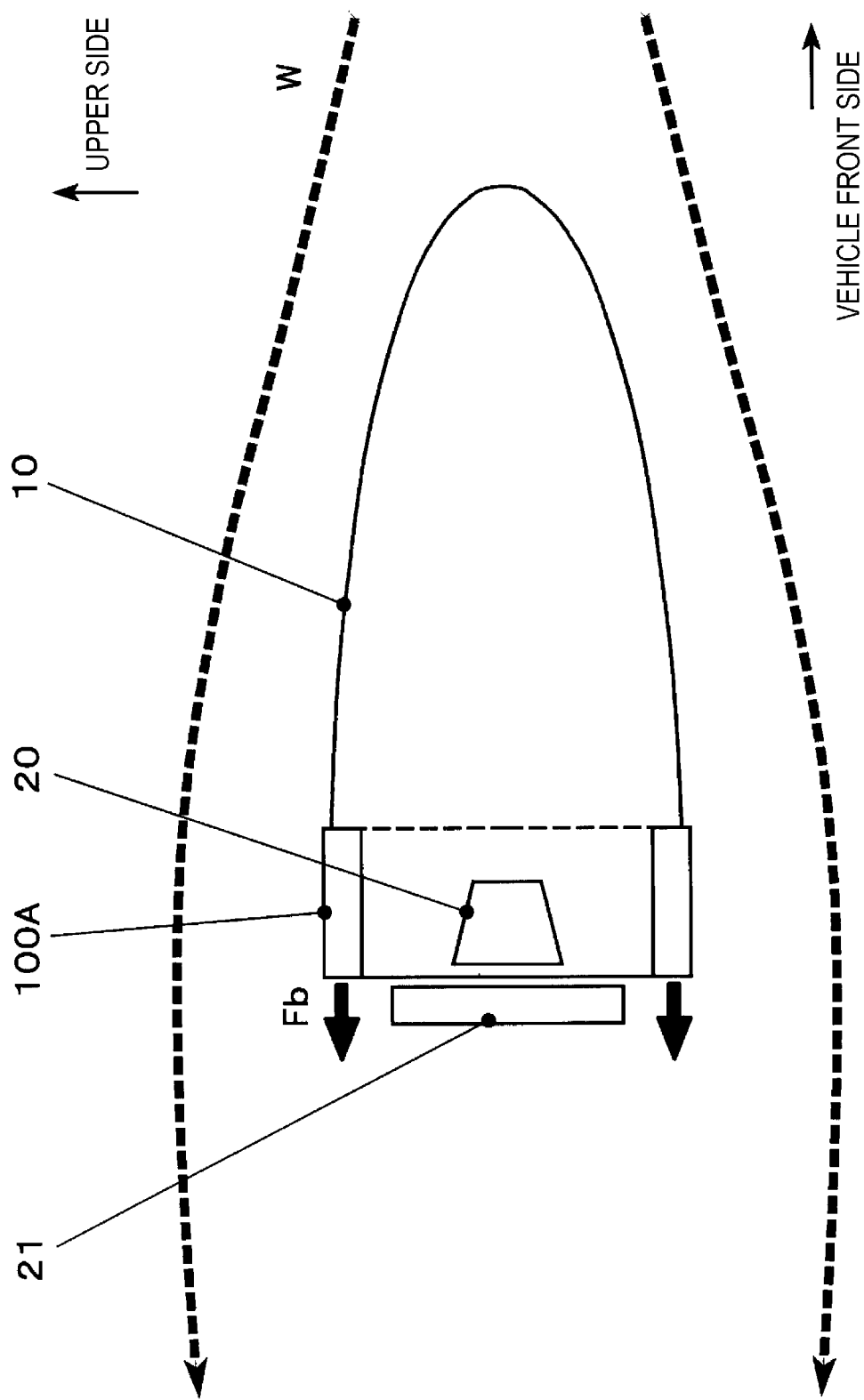
FIG. 4 is a schematic view of a side view camera including a second embodiment of a rectifying device to which the disclosure is applied.

FIG. 4 is a schematic view of a configuration of a side view camera including a rectifying device according to the second embodiment.

In the second embodiment, the housing 10 has a so-called bullet shape in which a cross-sectional area (a front projection area) is largest on the rear end side.

In the second embodiment, a two-electrode plasma actuator 100A is provided at the rear end (the outer periphery of the rear face 13) of the housing 10.

Figure 5:
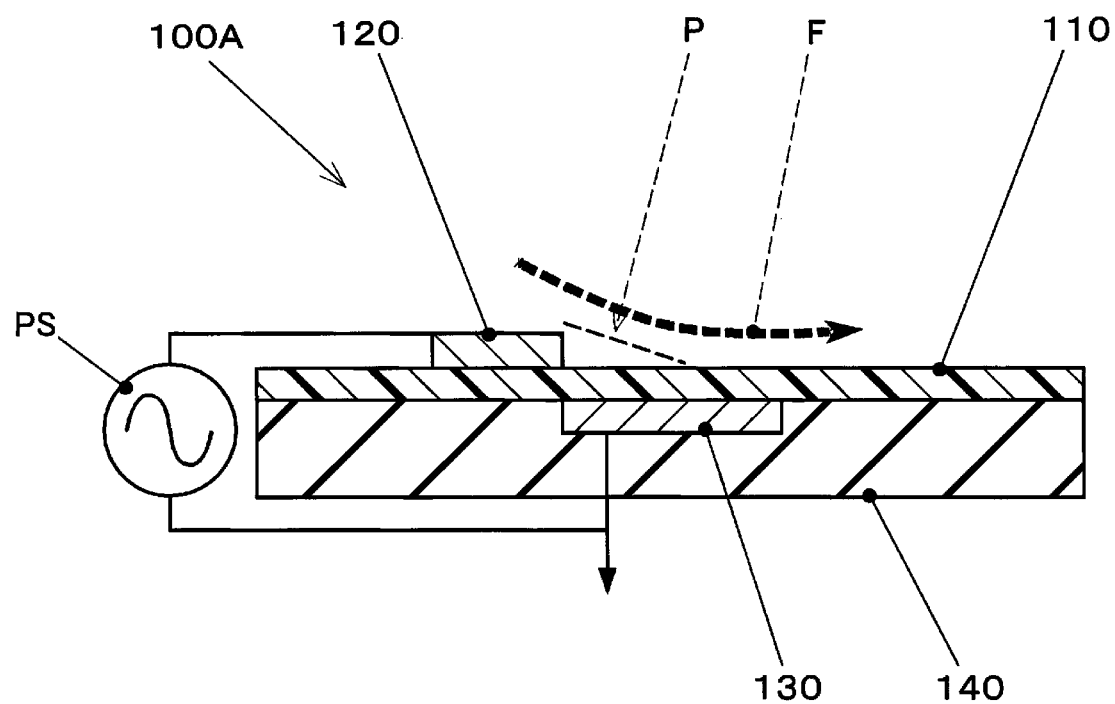
FIG. 5 is a schematic sectional view of a two-electrode plasma actuator provided at the rectifying device according to the second embodiment.

FIG. 5 is a schematic sectional view of a two-electrode plasma actuator provided at the rectifying device according to the second embodiment.

In the two-electrode plasma actuator 100A, the upper electrode 120 is provided only on one side of the lower electrode 130.

Such a two-electrode plasma actuator 100A can generate the air flow F in a wall-jet form that flows along the dielectric 110.

In the second embodiment, the plasma actuator 100A is provided to surround the rear face 13 when viewed from the vehicle rear side. The plasma actuator 100A is configured to generate an air flow Fb that travels toward the vehicle rear side.

According to the second embodiment described above, the air flow Fb ejected by the plasma actuator 100A functions as a tubular air curtain that surrounds the rear face 13. Consequently, it is possible to suppress the travelling wind W from flowing toward the rear face 13 and suppress adherence of foreign matter to the lens 21.

In some embodiments, the plasma actuator 100A surrounds, for example, the whole circumference of the outer periphery of the rear face 13. Alternatively, the plasma actuator 100A may be provided in a partial region of the outer periphery of the rear face 13.

In the second embodiment described above, due to the above-described effect as an air curtain, it is possible to suppress adherence of foreign matter to the lens 21 due to the travelling wind W flowing toward the rear face 13 of the housing 10.

It is also possible to obtain a certain rectifying effect by using the two-electrode plasma actuator 100A having a simple structure.

Third Embodiment

Next, a third embodiment of a rectifying device to which the disclosure is applied will be described.

Figure 6:
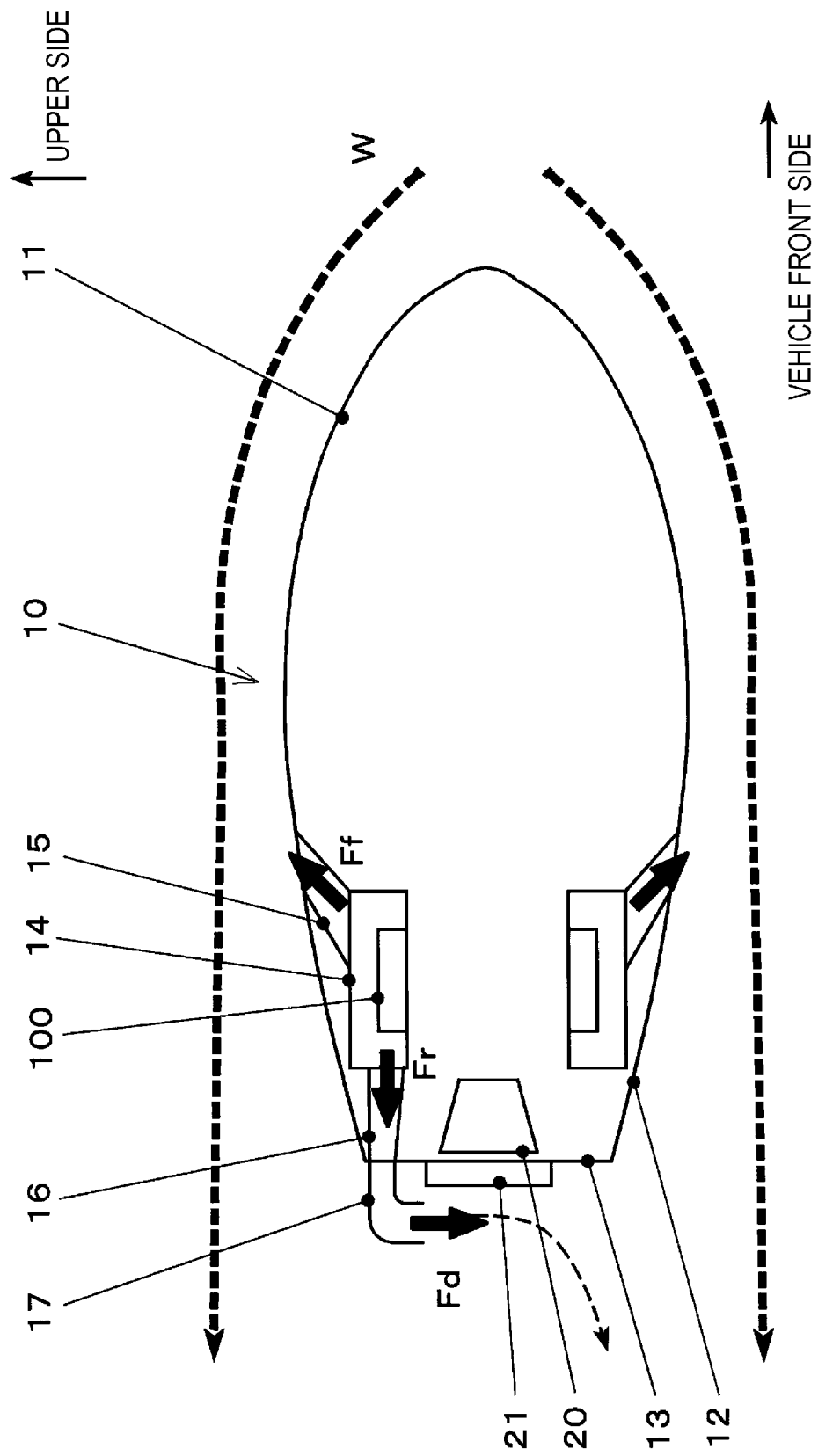
FIG. 6 is a schematic view of a configuration of a side view camera including a third embodiment of a rectifying device to which the disclosure is applied.

FIG. 6 is a schematic view of a configuration of a side view camera that includes a rectifying device according to the third embodiment.

The housing 10 according to the third embodiment is provided with a plasma actuator chamber 14, a front flow path 15, a rear flow path 16, a bent flow path 17, and the like.

The plasma actuator chamber 14 is a space that is disposed in the inner portion of the rear half portion 12 of the housing 10. The three-electrode plasma actuator 100 is housed in the space.

The plasma actuator 100 is disposed in the inner portion of the plasma actuator chamber 14 such that the array direction of the upper electrodes 120A and 120B is the vehicle front-rear direction.

The plasma actuator chamber 14 can be provided in an annular form along the outer peripheral surface of the housing 10 or can be provided at a plurality of locations scattered in the circumferential direction.

The front flow path 15 is a flow path along which the forward air flow Ff generated by the plasma actuator 100 in the inner portion of the plasma actuator chamber 14 is ejected to the outside of the housing 10.

The front flow path 15 has an inlet at the front end of the plasma actuator chamber 14 and an outlet that opens at the outer peripheral surface of the rear half portion 12 of the housing 10. The front flow path 15 is inclined with respect to the vehicle front-rear direction such that the outlet side is on the further outer side and the further vehicle front side with respect to the center of the housing 10 than the inlet (the air flow Ff is ejected toward the obliquely front side).

The air flow Ff has a function of separating and blowing the travelling wind W that flows along the surface of the housing 10, from the surface not to flow toward the rear face 13.

The rear flow path 16 is provided in a region on the upper side (upper side of the lens 21) of the housing 10 in the plasma actuator chamber 14. The rear flow path 16 is a flow path along which the rearward air flow Fr generated by the plasma actuator 100 in the inner portion of the plasma actuator chamber 14 is ejected toward the rear face 13 of the housing 10.

The bent flow path 17 projects from the rear face 13 of the housing 10. The bent flow path 17 is a flow path along which the air flow Fr that has exited from the rear flow path 16 is bent (deflected) toward the lower side and ejected as a downward flow Fd that flows downward along the surface of the lens 21.

According to the third embodiment described above, the downward flow Fd blows water droplets and the like adhering to the lens 21. Consequently, it is possible to ensure the function and the performance of the camera 20 even when, for example, precipitation is comparatively large.

By housing the plasma actuator 100 in the plasma actuator chamber 14 provided in the inner portion of the housing 10, it is possible to protect the plasma actuator 100 from being damaged by collision with foreign matter, such as scattered stone.

Fourth Embodiment

Next, a fourth embodiment of a rectifying device to which the disclosure is applied will be described.

The fourth embodiment suppresses adherence of foreign matter to a detector of a rear side radar provided, for example, on the inner side of a side surface of a rear bumper face provided at the rear of a vehicle.

Figure 7:
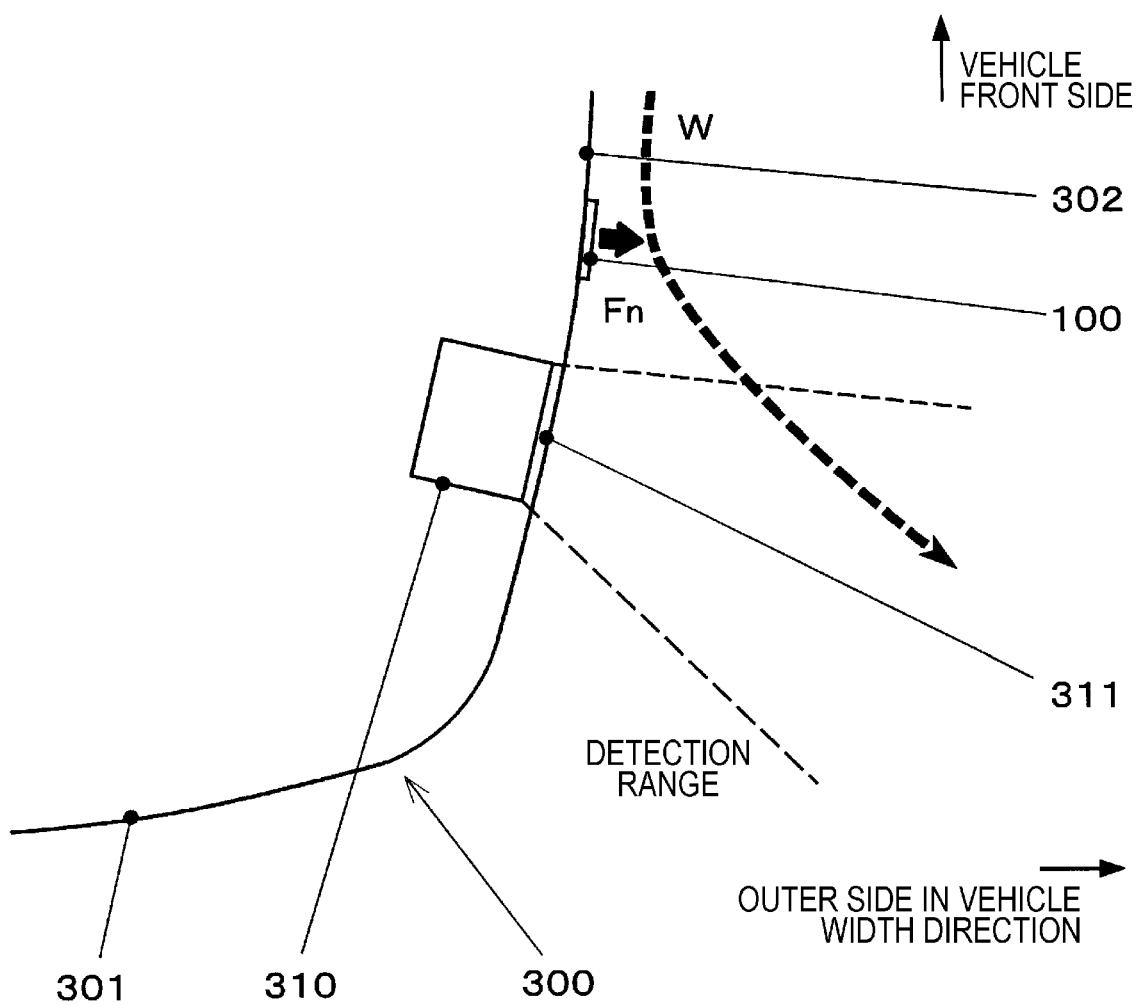
FIG. 7 is a schematic view of a configuration of a rear side radar including a fourth embodiment of a rectifying device to which the disclosure is applied.

FIG. 7 is a schematic view of a configuration of a rear side radar that includes a rectifying device according to the fourth embodiment.

A vehicle includes a rear bumper face 300.

The rear bumper face 300 is an exterior member formed of, for example, a resin material of a PP resin or the like so as to be one body and constitutes a design face of the vehicle body.

The rear bumper face 300 has a rear face 301 and a side face 302.

The rear face 301 is a part disposed in a region including the center part in the vehicle width direction to mainly face the vehicle rear side.

The rear face 301 is a gently curved surface protruding on the vehicle rear side.

The side face 302 is a face extending toward the vehicle front side from an end of the rear face 301 in the vehicle width direction and is a part that mainly faces the side of a side of the vehicle.

The side face 302 is a gently curved surface protruding on the side of a side of the vehicle and is inclined with respect to the vehicle front-rear direction such that the front end thereof is on the outer side in the vehicle width direction with respect to the rear end thereof.

A rear side radar 310 is a sensor configured to detect an obstacle on the rear side of the vehicle.

As the rear side radar 310, for example, a 24 GHz-band submillimeter-wave radar or the like is usable.

An antenna (detector) 311 with which the rear side radar 310 transmits and receives radio waves is provided at the side face 302 of the rear bumper face 300.

In the fourth embodiment, the three-electrode plasma actuator 100 that is the same as that of the first embodiment is provided in a region on the vehicle front side with respect to the antenna 311 at the side face 302 of the rear bumper face 300.

The plasma actuator 100 ejects, toward the outer side in the vehicle width direction, the air flow Fn that travels substantially in the normal direction of the side face 302.

According to the fourth embodiment described above, it is possible to suppress adherence of foreign matter to the antenna 311 by separating, from the side face 302, the travelling wind W that flows on a side of the vehicle substantially along the side face 302 of the rear bumper face 300 and blowing the travelling wind W in a direction away from the antenna 311 of the rear side radar 310.

Modifications

The disclosure is not limited to the embodiments described above, and various modifications and changes are possible. These modifications and changes are also included in the technical scope of the disclosure.

The shapes, the structures, the materials, the manufacturing methods, the arrangement, and the number of the members constituting a rectifying device, the generation direction of an air flow, and the like are not limited to those in the embodiments and can be changed, as appropriate.

For example, the generation direction of an air flow can be changed, as appropriate, as long as an effect of suppressing travelling wind from flowing toward a detector of a sensor can be obtained.

The sensor that suppresses adherence of foreign matter, such as water droplet and dust, is also not limited to a camera or a rear side radar such as that in the embodiments, and can be changed, as appropriate.

For example, the disclosure is also applicable to suppression of foreign-matter adhesion to a detector of a sensor of other types, such as a detector of an ultrasonic sonar or a laser scanner.

In each of the embodiments, a raindrop sensor is used to detect a rainfall state, and an air flow is generated by a plasma actuator. However, the manner for detecting a rainy state is not limited thereto and can be changed, as appropriate. For example, a rainfall state may be detected on the basis of the optical reflectance of a road surface obtained by subjecting an image in which the road surface is imaged to image processing or information obtained through road-to-vehicle communication or the like.

An air flow can be generated from a plasma actuator, even in a state other than a rainfall state, when adhesion of foreign matter to a detector of a sensor is a problem.

According to the disclosure, an air flow generator generates an air flow that separates travelling wind from a detector to thereby suppress foreign matter, for example, water droplets (raindrops), dust, grime, soil, and, mud from being carried by the travelling wind and adhering to the detector of a sensor.

It is also possible, by using a plasma actuator as an air flow generator, to generate an air flow in a desired direction responsively with a simple structure having no movable part.

According to the disclosure, travelling wind that flows along the second face is blown in a direction away from the second face. Consequently, it is possible to suppress adhesion of foreign matter to a detector.

According to this, an air flow that flows along the second face is blown toward the rear side. Consequently, it is possible to cause the air flow to function as an air curtain, suppress travelling wind from flowing toward the first face, and suppress adhesion of foreign matter to a detector.

According to the disclosure, when a detector of a sensor configured to detect a status of the rear side is provided at a side surface or an upper surface of a vehicle, travelling wind that flows along an exterior member is blown in a direction avoiding the detector. Consequently, it is possible to suppress adhesion of foreign matter to the detector.

According to the disclosure, by blowing water droplets and the like adhering to a surface at which a detector is provided, it is possible to ensure the function and the performance of a sensor.

As described above, according to the disclosure, it is possible to provide a rectifying device configured to suppress adhesion of foreign matter to a detector of a sensor effectively with a simple structure.

The invention claimed is:

1. A rectifying device comprising:
    an air flow generator disposed at an exterior member of an electronic side-view mirror of an automobile, the exterior member being adjacent to a lens of a camera that is configured to image a rear side of the automobile, the air flow generator being configured to generate an air flow that separates, from the lens of the camera, travelling wind that accompanies travel of the automobile,
    wherein the air flow generator comprises a plasma actuator that comprises at least a pair of electrodes and a power source that is configured to apply an alternating current voltage to the at least the pair of electrodes,
    wherein the exterior member comprises
    a first face that faces the rear side of the automobile, the first face including a flat plane substantially orthogonal a front-rear direction of the automobile, the lens of the camera being provided at the first face,
    a second face that extends toward a forward direction of the automobile from an end of the first face or from a portion of the first face near the end, the end being adjacent to the lens, and
    an edge-shaped joint that connects the first and second faces and has an edge-shape, and
    wherein the air flow generator is provided at the second face and configured to generate the air flow that comprises a velocity component in a direction away from the second face.

2. The rectifying device according to a claim 1, further comprising:
    an air flow guide configured to cause a portion of the air flow generated by the air flow generator to be ejected along the first face.

3. An automobile, comprising:
    an electronic side-view mirror comprising:
    an exterior member disposed to project outward in a width direction of the automobile from a surface of a body of the automobile and comprising a first face that faces a rear side of the automobile, a second face and an edge-shaped joint, the first face including a flat plane substantially orthogonal a front-rear direction of the automobile, the second face extending toward a forward direction of the automobile from an end of the first face, the edge-shaped joint connecting the first and second faces and having an edge-shape;
    a camera comprising a lens that provided at the first face that faces the rear side of the automobile, the camera being configured to image the rear side of the automobile; and
    a plasma actuator provided at the second face and configured to generate an air flow that comprises one or both of a velocity component in a direction away from the second face and a velocity component toward the forward direction.

4. The automobile according to a claim 3, further comprising a raindrop sensor configured to detect rainfall, and a control unit configured to control the plasma actuator,
    wherein the control unit is configured to cause the plasma actuator to generate the air flow that comprises one or both of the velocity component in the direction away from the second face and the velocity component toward the forward direction when the raindrop sensor detects the rainfall, and
    wherein the control unit is configured to cause the plasma actuator to generate an air flow that comprises a velocity component toward the rearward direction when the raindrop sensor does not detect the rainfall.

5. The automobile according to a claim 3, further comprising an air flow guide configured to cause a portion of the air flow generated by the plasma actuator to be ejected along a face of the lens.

6. The automobile according to a claim 3, wherein the second face includes an upper surface of the exterior member and a bottom surface of the exterior member,
   wherein the edge-shaped joint includes i) a first edge that connects an upper end of the first face and the upper surface of the second face and ii) a second edge that connects a bottom end of the first face and the bottom surface of the second face, and
   wherein the plasma actuator includes i) a first plasma actuator located on the upper surface and ii) a second plasma actuator located on the bottom surface.

7. The automobile according to a claim 3, further comprising a velocity sensor configured to detect a traveling velocity of the automobile, and a control unit configured to control the plasma actuator,
   wherein the control unit is configured to increase a flow velocity of the air flow generated by the plasma actuator in accordance with an increase in the traveling velocity detected by the velocity sensor.

8. The automobile according to a claim 3, further comprising a control unit configured to control the plasma actuator,
   wherein the control unit is configured to activate the plasma actuator when a wiper device configured to wipe a windshield of the automobile is operated, wherein the control unit is configured to deactivate the plasma actuator when the wiper device is not operated.

9. The automobile according to a claim 3, further comprising a raindrop sensor configured to detect rainfall, and a control unit configured to control the plasma actuator,
   wherein the control unit is configured to activate the plasma actuator when the raindrop sensor detects the rainfall, and
   wherein the control unit is configured to deactivate the plasma actuator when the raindrop sensor does not detect the rainfall.

10. The automobile according to a claim 5, wherein the air flow guide is located above the lens and is configured to cause the portion of the air flow generated by the plasma actuator to be ejected as a downward flow that flows downward along the face of the lens.

11. An automobile, comprising:
   an electronic side-view mirror comprising:
      an exterior member disposed to project outward in a width direction of the automobile from a surface of a body of the automobile and comprising a first face that faces a rear side of the automobile, a second face and an edge-shaped joint, the first face including a flat plane substantially orthogonal a front-rear direction of the automobile, the second face extending toward a forward direction of the automobile from an end of the first face, the edge-shaped joint connecting the first and second faces and having an edge-shape;
      a camera comprising a lens that provided at the first face that faces the rear side of the automobile, the camera being configured to image the rear side of the automobile; and
   a plasma actuator provided at the edge-shaped joint and configured to generate an air flow that comprises a velocity component toward the rearward direction.

* * * * *